FIG. 2

INVENTORS
Robert W. Pfeiffer
Luther W. Garrett, Jr.
BY
John C. Quinlan ATTORNEY
Wayne C. Jaeschke AGENT Oct. 4, 1966 R. W. PFEIFFER ETAL 3,276,858
METHOD FOR CARRYING OUT GAS-SOLIDS REACTIONS
Filed Dec. 7, 1964 3 Sheets-Sheet 3

INVENTORS
Robert W. Pfeiffer
BY Luther W. Garrett, Jr.

John C. Quinlan ATTORNEY
Wayne C. Jaeschke AGENT

United States Patent Office 3,276,858
Patented Oct. 4, 1966

3,276,858
METHOD FOR CARRYING OUT GAS-SOLIDS REACTIONS
Robert W. Pfeiffer, Bronxville, N.Y., and Luther W. Garrett, Jr., Allison Park, Pa., assignors to Pullman Incorporated, Chicago, Ill., a corporation of Delaware
Filed Dec. 7, 1964, Ser. No. 416,541
5 Claims. (Cl. 75—1)

This application is a continuation-in-part of prior and co-pending application Serial No. 120,285, filed June 28, 1961 which is now U.S. Patent No. 3,160,499, issued December 8, 1964.

This invention relates to a method for carrying out gas-solids reactions, and, more particularly to a method for carrying out gas-solids reactions of the oxidation reduction type. Still more particularly, the invention relates to a method for reducing metal oxides and specifically to a method for reducing and up-grading low-grade metal ores, particularly iron ores, to permit their extensive utilization in the production of iron or steel in an economic manner.

One of the most important problems confronting the iron and steel industry is the rapid depletion of high-grade iron ores in the United States, and the steel industry is therefore concerned with the need for the development of methods which will permit the utilization of low-grade iron ores, such as are found in the Lake Superior district. In this respect, the current trend in the United States for processing only high-grade iron ores or beneficiated concentrates containing 60 percent or more of iron, means that unless low-grade ores can be utilized, the commercially usable ores in this district will be exhausted within a relatively short period. Thus, the development of suitable methods for the concentration of an almost inexhaustible supply of low-grade ores is essential to the iron and steel industry. In order to develop such methods, commercial research has involved the studying of new and old processes. The most important processes for ore concentration are, in general, magnetic concentration of natural magnetites, and up-grading of hematites by various gravity concentration processes. In this respect, it is found that most of the remaining lean ores in the Lake Superior and other districts are not magnetic and that the iron oxide and the gangue materials are often of such size range or mineralogical type that gravity concentration methods have been found to be impractical. Flotation processes have also been experimented with, quite extensively; however because of the complex nature of certain ores (e.g., iron occurring in the form of limonite and iron carbonate), the flotation methods that have been developed are often complicated and expensive. Thus, as a result of the disadvantages of the gravity concentration and flotation processes, magnetic roasting (i.e., magnetizing reduction) and concentration processes to produce high-grade artificial magnetite have been receiving careful attention in recent years.

Processes for magnetic concentration of non-magnetic ores are based upon the practice of converting the oxides or carbonates in the non-magnetic ores to the magnetic oxides, and thereafter these ores can be concentrated by methods normally employed for concentration of natural magnetites. The chemical reactions and equilibria involved in the magnetic roasting of iron oxide are well-known, however, attempts to commercialize this process have usually resulted in failure. The major causes of these failures are the lack of adequate roasting equipment and techniques, and as a result, roasting costs have been prohibitive. Since the magnetic roasting process comprises only one step in the process of beneficiation, it becomes evident that the cost of magnetic roasting must be kept very low to render it economically attractive.

Magnetic roasting processes, previously proposed, employ a reduction reactor which may be one of the shaft furnace, traveling grate, multiple hearth, rotary kiln or fluidized solids unit types. Of these types, all but the last two will not handle iron ore fines, so that if wash plant tailings were to be used as a feed, there would be necessitated the inclusion of an agglomeration step in the roasting process. In addition, the operating and maintenance costs of several of the types mentioned above are very high. Furthermore, in practice, the efficiency of any of the aforementioned five types of reduction reactors has been found to be very low, in that over-reduction to wustite can occur due to failure to control reducing gas composition, or high fuel requirements or poor gas-solids contact is encountered thereby resulting in a high reducing gas consumption. The fluidized solids unit type reduction reactor eliminates many of the above disadvantages, but also introduces new difficulties, from a standpoint of ease of operation. If these difficulties could be overcome, the fluidized reduction reactor type system would offer a practical and economical means for conducting a roasting process for the up-grading of otherwise worthless iron ores.

In the above-referenced prior and co-pending application, an improved method is taught for the reduction of non-magnetic iron-containing material to obtain $Fe_3O_4$ in which the reduction is carried out in a fluidized bed reduction zone. The improved method comprises carrying out the following combination of process steps.

A fluidized bed of the iron-containing material in particulate form is maintained in a reduction zone at a temperature between about 800 and about 1400° F. A reducing gas stream is introduced into the reduction zone having reducing and oxidizing components and having a fixed composition within equilibrium values for the reducing and oxidizing components of the gas at the reduction temperature within the aforementioned range so that over-reduction beyond ethe $Fe_3O_4$ point cannot occur. A gaseous effluent of low calorific value is withdrawn from the reduction zone at a temperature within the aforementioned range. A suitable fuel is burned and the gaseous combustion products and the gaseous effluent of low calorific value are admixed in sufficient relative quantities to heat the gaseous effluent to an elevated temperature between about 1000 and about 2000° F. The thus-heated effluent is employed to contact a mass of relatively cool iron-containing particles to cause the mass to be heated to an elevated temperature. The heated particles are separated from the gaseous effluent, transferred to the reduction zone, and particles reduced to $Fe_3O_4$ are withdrawn from the reduction zone.

It is an object of the present invention to provide a further improved method for reducing metal oxides.

Another object of the invention is to provide an improved method for the reduction of iron oxides in an economical and efficient manner.

Another object of the invention is to provide an improved method for reducing and up-grading low-grade iron oxide ores to permit their economical recovery by magnetic separation methods.

Another object of the present invention is to provide an improved method for preheating cold particulate feed material of fluidizable particle size to an elevated temperature prior to introduction of the feed to a suitable reduction zone.

Another object of the present invention is to provide a method for reducing the required reaction volume needed for effecting oxidation-reduction reactions of the gas-solids type such that such reactions can be carried out in equipment of economical proportions.

Another object is to provide a method for reducing metal ores containing heat-sensitive substances such as carbonates and combined water.

Another object is to provide a method for obtaining magnetic oxides from certain iron ores which cannot be reduced, in an economically practicable manner, directly from the hematitic to the magnetic form of the oxide employing a reducing gas fixed in composition such that over-reduction beyond the $Fe_3O_4$ point cannot occur.

A further object of the present invention is to provide a method for preparing iron oxide particles in suitable form for magnetic separation in which only a minor percentage of the iron oxide is converted to the magnetic form.

Various other objects and advantages inherent in the invention will become apparent from the following description and disclosure.

The objects are generally accomplished in accordance with one aspect of the present invention by contacting cold particulate feed of fluidizable particle size comprising a metal ore and a reheated effluent of the reduction zone hereinafter described to partially heat the feed material, separating the gaseous material from particulate material in a gas-solids separation zone, further heating particulate material to within the range of temperature employed in the reduction zone by suspending the particulate material in the gaseous combustion products of fuel burned in a particulate fluidization zone, separating heated particulate material from the gaseous combustion products which are further employed to reheat the effluent of the reduction zone, and passing the heated particulate material as the feed to a reduction zone in which the particulate material is maintained in fluidized suspension at least partly by the reducing gas employed as the reducing medium. This aspect of the present invention is particularly useful when applied to the reduction of ores which contain substances which will decompose and volatilize at the reduction temperature employed in the reduction zone, for example, ores such as the siderites, limonites and other ores containing carbonates, carbonaceous material, water of crystallization and like materials.

In another aspect, the objects are generally accomplished by carrying out specified gas-solids oxidation-reduction reactions in at least two separated dense phase beds of fluidized particulate material. The particulate material in each of the separated beds is contacted with separate, parallel entering streams of treating gas in order to effect the desired gas-solids oxidation-reduction reaction in each bed. The particulate material flows serially through the dense phase beds. The particulate material is introduced to the first bed and is treated with a first gaseous material containing oxidizing and reducing constituents and fixed in composition to effect the desired reaction. Particulate material treated in the first bed is passed to a second bed wherein such material is treated with a second treating gas. The particulate material may be passed to successive fluidizied beds for further reaction as desired. The separated fluidized beds can be maintained in a single reactor by providing suitable baffle means to separate the beds, or in separate reaction vessels.

In a preferred embodiment of the present invention, fluidizable particles of iron ore are introduced to a first fluidized bed maintained in a reduction zone and contacted with a first reducing gas for a period of time sufficient to reduce a portion of the iron ore. A portion of the reduced material is then passed from the first bed to a second bed in the reduction zone and contacted with a second reducing gas having a reducing strength substantially the same as the first gas for a period of time sufficient to further reduce the ore material. Product material can be withdrawn from the second bed or passed to yet another fluidized bed within the reduction zone to carry the reduction to a greater extent. It has been discovered that when the reduction of an iron-containing ore is carried out in this manner, a surprising and unexpected decrease in the reaction volume needed to produce a specified quantity of reduced material is accomplished, in comparison with carrying out the reduction in a single fluidizable bed reduction zone. This improvement can be employed in the production of magnetic oxide ($Fe_3O_4$) from low-grade hematite ores in order to facilitate a recovery of the iron content of such ores by magnetic separation methods and means, and in the production of elemental iron (Fe) in the form of iron sponge. It is contemplated that such improvement can also be employed in the reduction of a wide variety of other metal oxides and ores including, for example, oxides of copper, nickel, manganese and like materials, in the gas-solids oxidation-reduction reactions, and in gas-solids reactions such as the reactions effected in the regenerator of a fluid catalytic cracking unit wherein the solid is the desired product of the gas-solids reaction.

In applying the improvements set forth in general terms above to the art of reduction of non-magnetic iron ore to magnetite, it is preferred in one aspect that gas streams of essentially the same reducing strength and composition be introduced into, for example, two separated fluidized beds, such gas streams comprising reducing and oxidizing components each having a fixed composition within equilibrium values for the reducing and oxidizing components of the gas at the reduction temperature employed in the reduction zone so that over-reduction beyond the $Fe_3O_4$ point cannot occur. Gaseous materials employed for this purpose include, for example, mixtures of carbon dioxide and carbon monoxide, hydrogen and water mixtures, and intermixings of these enumerated constituents. Phase diagrams and equilibrium data defining the ratios of oxidizing and reducing constituents of the various gases over commercial temperature ranges for the system comprising $Fe_2O_3$ (hematite) and $Fe_3O_4$ (magnetite) and FeO (wistite) and Fe (elemental iron) are available in the literature, for example, in U.S. Patent No. 2,528,552, FIGURE 1 and in the Journal of the American Chemical Society, volume 67, pages 1398–1412 (1945).

Certain low-grade hematite ores are found to be difficult to reduce to the magnetic form because of their low porosity, characteristic matrix of the gangue and iron constituents, and composition of both gangue and iron. An example of an ore which is difficult to reduce because of its low porosity is the Rusk ore from Texas, the composition of which ore is specified as Table 10 in Example 3. When such an ore is placed in an atmosphere suitable for obtaining $Fe_3O_4$ under equilibrium conditions, the rate of reduction of hematite to $Fe_3O_4$ is extremely slow and consequently an enormous and commercially impracticable reaction volume is needed in order to produce practicable yields of magnetite. Such ores can be converted to magnitite in a commercially attractive manner, however, employing the following preferred modification of this aspect of the present invention. In this modification, instead of introducting separate gaseous streams having the same composition and reducing strength to the separated fluidized beds of material to be reduced, a reducing gas stream having reducing and oxidizing components and having a fixed composition beyond equilibrium values for the reducing and oxidizing components of the gas at the reducing temperature which is employed so that reduction beyond the $Fe_3O_4$ point can occur, is contacted with particulate ore feed in a first fluidized bed in the reduction zone. The reducing gas can be of a composition to permit formation of iron. The contact is, preferably, maintained for a period of time sufficient to remove a total amount of oxygen from the ore which will preferably correspond to 90–100 percent conversion to magnetite. The contact time is limited in this manner to prevent or impede the formation of the undesirable iron silicate known as fayalite, which is a non-magnetic compound of iron. It should be noted that under these conditions, it is possible that the reduced material could contain iron in various stages of reduction, including hematite, magnetite, wustite and elemental iron, depending upon the rates of reaction for formation of these phases. Normally, however, the major portion of the reduced iron would be in the form of magnetite, with relatively smaller amounts of wustite and elemental iron existing on the outer surfaces of each particle. The reduced material is then passed into a second fluidized bed of the reduction zone and contacted therein with a gas stream which is oxidizing with respect to elemental iron and wustite and which has a fixed composition within equilibrium values for the oxidizing and reducing components of the gas at the temperature of the second fluidized bed such that oxidation beyond the $Fe_3O_4$ point cannot occur. The contact is maintained for a period of time sufficient to convert a major portion of the FeO and/or Fe to $Fe_3O_4$. In this manner, a large percentage of the iron oxide can be converted to a form suitable for economic separation by magnetic means. It should also be noted that the equilibrium composition of the gas to the second fluidized bed can be adjusted not only to convert FeO and Fe to $Fe_3O_4$, but also to convert fayalite to $Fe_3O_4$.

The temperature conditions employed in the reduction of low-grade hematite ores to magnetite are generally maintained between about 800 and about 1400° F. and preferably between about 1000 and about 1200° F., the preferred upper limit being desirable from a standpoint of minimizing the formation of siliceous material such as fayalite, since it has been found that that kinetics for fayalite formation are very favorable above about 1200° F. For the same reasons, the total reaction residence time for solids undergoing reduction is preferably maintained at less than about 90 minutes.

In accordance with another aspect of the present invention, the objects are generally accomplished by grinding low-grade hematite ore material to a size such that the iron oxide content of the ore is physically liberated from siliceous material with which it has been physically combined. The grinding preferably reduces the particle size, e.g., to 10 mesh to about 325 mesh top size, depending upon the liberation characteristics of the particular ore. The comminuated ore material is then suspended in a reducing gas under conditions suitable to form a superficial layer of magnetic oxide on the liberated hematite particals. The gaseous material is then separated from the particulate material, which is passed to suitable magnetic separation means for recovering the magnetized ore from the gangue and siliceous material. The process is preferably carried out employing a transfer line heat exchange zone for the purpose of preheating comminuted ore to about reaction temperature and a transfer line reaction zone provided that the rate of reduction of the particular ore is sufficiently high taking into consideration the strength of reducing gases being employed. The velocity of the gas-solids suspension in the transfer line zones is maintained preferably between about 10 to about 90 feet per second and the residence time within the transfer line reaction zone is preferably maintained between about 0.5 to about 12 seconds, employing reaction zone temperatures between about 1100 to about 1800° F. The reducing gas introduced to the transfer line reaction zone is preferably fixed in composition within equilibrium values to permit reduction beyond the $Fe_3O_4$ point to wustite or even elemental iron at the reduction temperature employed, however, because of the short contact time in the transfer line reaction a superfical layer, only, of magnetite is formed on the ore particles. It is preferred that less than about 50 percent of the $Fe_2O_3$ content of the comminuted ore particles be reduced to $Fe_3O_4$ at the surface thereof to provide a magnetized surface coating sufficient for separating the iron particles from gangue by conventional magnetic separation means. The transfer line reactor can be followed by a small dense bed fluidized solids reactor, if necessary, to achieve the desired reaction. Having thus described the invention in general terms, reference is now made to the drawings in order to provide a better understanding of the present invention.

Figure 1:
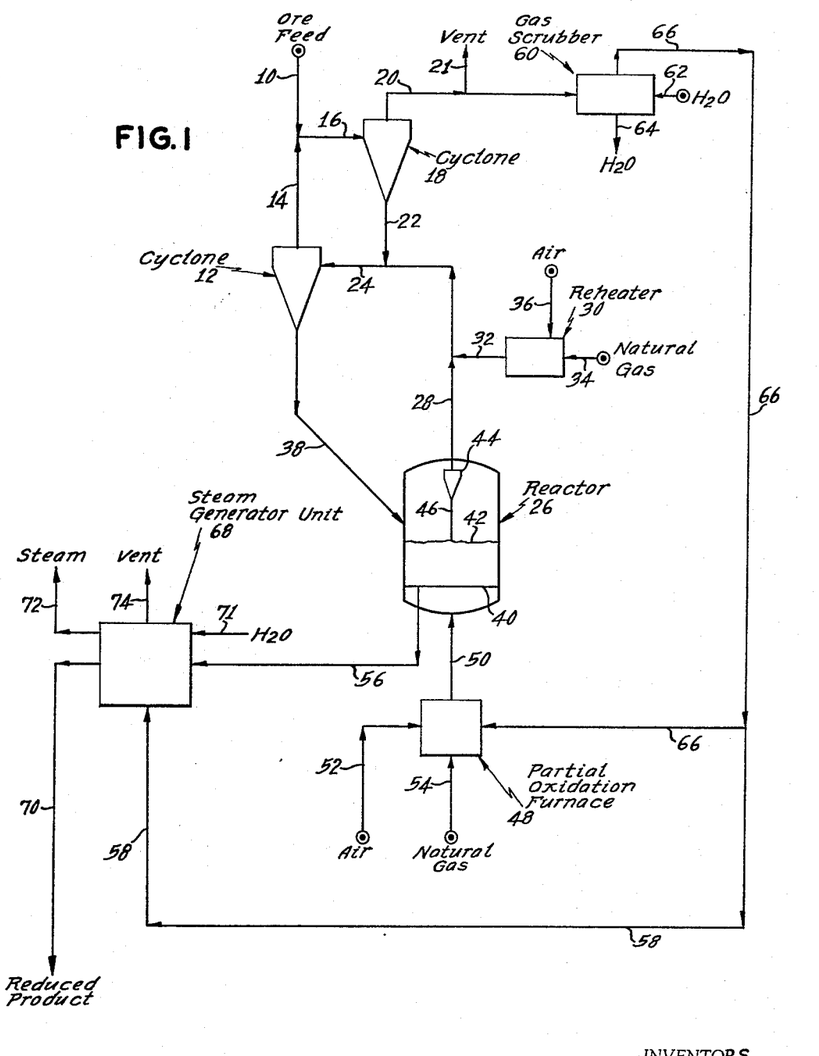
FIGURE 1 illustrates one embodiment of the process of the present invention employing a single fluidized bed of solids for carrying out gas-solids reactions.

Referring to FIGURE 1 of the drawings, a raw, non-magnetic hematite ($Fe_2O_3$) ore feed, containing about 2 percent free moisture and 5 percent combined $H_2O$, ground to about 20 mesh top size, and comprising approximately 30 percent iron, by weight, is introduced into conduit 10 at a temperature of about 77° F. and at the rate of 220 long tons per hour. The raw ore thus introduced into conduit 10 is brought into contact with hot reactor effluent gas withdrawn from cyclone 12 (as more fully hereinafter described) through conduit 14 at a temperature of 870° F. The contact between solids and gas results in a heat transfer in which the temperature of the solids is raised to about 250° F. and the temperature of the effluent gases from cyclone 12 is reduced to about 300° F. The velocity of the effluent gas in conduit 16 is preferably maintained at least about 10 percent above the maximum settling velocity of the largest ore particle present in the feed. As an example, where the ore feed is ground to about 12 mesh top size, the gas velocity in conduit 16 is maintained at about 70 feet per second. This velocity is also used for particles having smaller top sizes.

Following contact between raw ore solids from conduit 10 and hot effluent gases from conduit 14, the resulting mixture is transferred through heat-transfer conduit 16 to a cyclone 18 in which separation between solids and gases is effected. Gas, separated in cyclone 18, is withdrawn through conduit 20 at a temperature of about 300° F., to be handled as hereinafter discussed. Separated solids are withdrawn through conduit 22 at a temperature of about 250° F. The separated solids withdrawn from cyclone 18 through conduit 22 at a temperature of about 250° F. are next transferred through heat-transfer conduit 24, where they are contacted with hot effluent gas withdrawn from reactor 26, via conduit 28 which is reheated with the gaseous combustion product withdrawn from reheater 30, via conduit 32. The effluent gases from reactor 26 are withdrawn, via conduit 28, at a temperature of about 1100° F. In order to reheat these gases, as indicated above, natural gas is introduced into reheater 30 via conduit 34, at the rate of 202 mols per hour. Air is introduced into reheater 30 via conduit 36 at the rate of 2040 mols per hour. Following combustion of natural gas and air in reheater 30, the resulting combustion gases are withdrawn via conduit 32 at a temperature of about 3600° F. As a result of contact between combustion gases from reheater 30 and effluent gas withdrawn from reactor 26 via conduit 28, the temperature of the effluent gas is raised from about 1100° F., in conduit 28, to about 1600° F. after mixing. The specification of the combined gases in conduit 24, is as follows:

TABLE 1

| Gas | Mol percent | Mol ratio |
| --- | --- | --- |
| $H_2+CO$ | 2.13 | |
| $H_2/CO$ | | 2.33 |
| $CO_2/CO$ | | 17.9 |
| $H_2O/H_2$ | | 9.62 |
| $N_2$ | [1] 72 | |

[1] Remainder.

The contact of the separated solids withdrawn from cyclone 18 via conduit 22 at a temperature of about 250° F. with the hot gases in conduit 24 at a temperature of about 1600° F. results in raising the temperature of the solids in conduit 24 to about 820° F., and are transferred together with the gaseous products to cyclone 12. In cyclone 12, separation is effected between the heated gases which are withdrawn via conduit 14, as described above, and the preheated solids ($Fe_2O_3$) are transferred at a temperature of about 820° F. to reactor 26 via conduit 38. Reactor 26 is a fluidized-bed type reactor, provided with a perforated gas distribution grid 40, and is shown as having a fluid-bed level 42. Reactor 26 is also provided with one or more internal cyclones 44, for separating solids from gases, each equipped with a dipleg 46 for the return of fine solids to the fluid-bed level.

The preheated hematite ore introduced into reactor 26 via conduit 38, is contacted with a reducing gas introduced into reactor 26 and withdrawn from a partial oxidation furnace 48 via conduit 50. This gas, introduced at the rate of 8640 mols per hour, has the following composition:

TABLE 2

| Gas | Mol percent | Mol ratio |
| --- | --- | --- |
| $H_2+CO$ | 7.26 | |
| $H_2/CO$ | | 1.032 |
| $CO_2/CO$ | | 2.58 |
| $H_2O/H_2$ | | 2.88 |
| $N_2$ | [1] 72 | |

[1] Remainder.

To provide the required reducing gas for reactor 26, air is introduced into partial oxidation furnace 48 via conduit 52 at a temperature of 375° F. and at the rate of 3100 mols per hour and a pressure of 45 p.s.i.a.; while natural gas is introduced into furnace 48, via conduit 54, at a temperature of about 100° F. and at the rate of 424 mols per hour. In reactor 26, the preheated nonmagnetic hematite ($Fe_2O_3$) ore treated with the reducing gas introduced via conduit 50, is reduced to form the magnetic oxide magnetite ($Fe_3O_4$). This reaction, although it is technically a reduction reaction, is commonly referred to as a "magnetic roast." The reduced iron ore (magnetite) product is withdrawn from reactor 26 at a temperature of about 1100° F. via conduit 56, and may, as shown in the present embodiment, be transferred to suitable steam generation apparatus 68 to extract the heat values from the solids in the formation of steam which may be used for various purposes within the present system itself for the conservation of heat or energy, if so desired.

As previously indicated, the exit gas, separated in cyclone 18, is withdrawn through conduit 20 at the rate of approximately 12,812 mols per hour and at a temperature of 300° F. This gas has the following composition:

TABLE 3

| Gas | Mol percent | Mol ratio |
| --- | --- | --- |
| $H_2+CO$ | 1.81 | |
| $H_2/CO$ | | 2.28 |
| $CO_2/CO$ | | 17.6 |
| $H_2$ | | 21.6 |
| $N_2$ | [1] 61.3 | |

[1] Remainder.

The exit gas in conduit 20 is next divided into two separate streams. Approximately 41 percent of this exit gas is withdrawn from conduit 20 via conduit 21 and vented to the atmosphere, and the ($H_2+CO$) contained in this vent is lost from the process. The remaining portion of the gas stream in conduit 20 is next subjected to a scrubbing and quenching treatment, and for this purpose is transferred through this conduit to gas scrubber 60. Cooling water is introduced into scrubber 60 via conduit 62. As a result of the scrubbing and quenching action in scrubber 60, entrained material present in the introduced gas is separated, and water vapor is condensed with the formation of an aqueous phase and a gaseous phase. The aqueous phase thus formed is withdrawn from scrubber 60 through conduit 64, and thus removed from the system. The gaseous phase, substantially free of entrained material and water vapor, is withdrawn at a temperature of about 100° F. through conduit 66. This gaseous phase is divided into two separate streams. Approximately 8 percent of this clean scrubbed gas is withdrawn from conduit 66 via conduit 58 to serve as fluidizing gas in the steam generation unit 68, wherein steam is produced and the reduced product from reactor 26 is cooled from about 1100° F. to about 600° F. and withdrawn from the system via conduit 70. Water employed for generating steam in unit 68 is introduced into the system via conduit 71. Steam is withdrawn from the unit 68 via conduit 72 and may be used within the present system or for other purposes. The gases from the gas scrubber 60, which were introduced into unit 68 via conduit 58, are withdrawn from the system via conduit 74 and vented to the atmosphere. The purpose of this gas is to maintain a fluidized bed in the steam unit 68. The remaining portion of the gas stream in conduit 66 may be transferred to partial oxidation furnace 48 for admixture with the reducing gas in the furnace and thus facilitate the control of the composition of the reducing gas, subsequently transferred to reactor 26 through conduit 50. If desired, another portion of the low-calorific quenched gas stream in conduit 66 may be burned in reheater 30 by admixing it with natural gas in conduit 34. In the embodiment described above, the entire system is maintained at a pressure between about 12 and about 28 p.s.i.g., because this pressure decreases the volume of gas and thus increases the throughput capacity of a given-size of equipment. In operation, the pressure imposed upon this system is set by the pressure build-up that can be obtained by a specific height of the feed-solids standpipe, as shown in conduit 10, and also by the mechanical design of external cyclones 12 and 18. However, by the use of lock-hoppers to feed solids into the system, operation at still higher pressures is possible. It will be understood, also, that the various flow rates, discussed above, are those in which only one "train" of cyclones, as shown in the drawing, is employed. It is within the scope of the present invention, to employ such additional trains, if desired, and these additional trains may be added in parallel to increase the capacity of the system. However, even in such modifications only a single reactor and a single gas scrubber will have to be employed. It will also be noted, in this connection, that while the use of cyclones has been indicated as a preferred apparatus for separation of solids and gases, other gas-solids operating devices may also be successfully employed for this purpose, such as filters or disengaging vessels, if so desired. Also, whereas this embodiment indicates two heat transfer contacts between cold inlet solids and reheated effluent gas, in other instances it may be desirable to use one, two or three or more heat transfer contacts.

Figure 2:
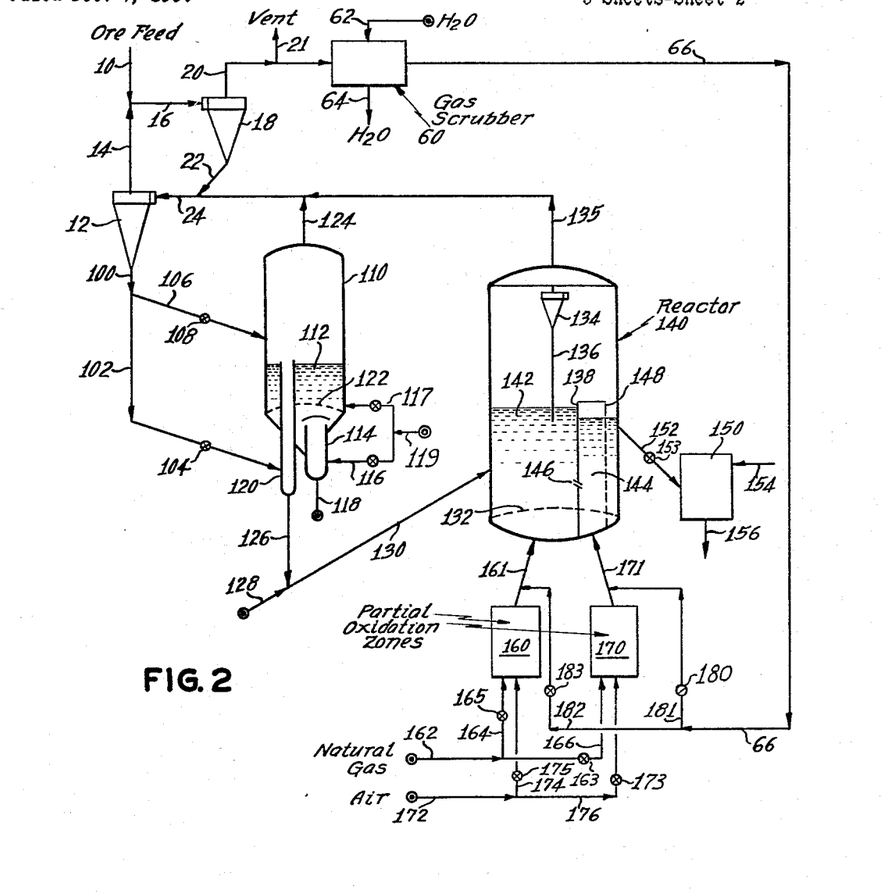
FIGURE 2 illustrates another embodiment of the process of the present invention employing pretreatment zone 110 and reactor 140 which contains baffle means for providing at least two dense phase beds of fluidized solids for carrying out gas-solids reactions in accordance with the present invention.

Referring now to FIGURE 2, the ore feed is introduced in lines 10 and 16, first to cyclone 18 and then by means of lines 22 and 24 to cyclone 12 wherein such ore is preheated by contact with elevated temperature gaseous material, as described with reference to FIGURE 1. Preheated ore is withdrawn from cyclone 12 by means of conduit 100 and a portion thereof is passed to pretreatment zone 110 through line 106 at a rate controlled by valve 108. Valve 104 in line 102 is normally maintained in throttling position, in order to have the remainder of the ore by-pass pretreatment zone 110 and thus achieve the desired temperature of the total solids entering reactor 140.

Pretreatment zone 110 comprises a vertically elongated vessel suitable for containing a fluidized bed of solid particulate material 112 above perforated grid 122. Burner chamber 114 is positioned within a bottom portion of vessel 110 and below grid 122 such that during the start-up operations the products of combustion flow from the burner chamber through grid 122 to preheat and fluidize the particulate material of bed 112. In steady state operations, however, a suitable fuel oil or gas is introduced directly into fluidized bed 112 by means of lines 119 and 117, while air or other suitable oxygen-containing gas is introduced thereto by means of line 118 and grid 122 in order to achieve combustion within the fluidized bed. The temperature of bed 112 is preferably maintained between about 1400 and about 1800° F. and, most preferably, about 1500 and about 1700° F. Preheated particulate material is withdrawn downwardly from an upper portion of bed 112 by means of withdrawal well 120 and conduit 126 depending downwardly therefrom. The mixture of the preheated material and the ore which by-passed zone 110 is picked up by means of fluidizing gas introduced in conduit 128 and passed in conduit 130 into baffled reactor 140.

Baffled reactor 140 comprises means for maintaining a plurality of separated beds of fluidized solids in relatively dense phase condition having an interconnected dilute phase. Reactor 140 is equipped with a vertical baffle 138 which separates the fluidized bed of solids 142 from the fluidized bed of solids 144. The baffle 138 is preferably arc-shaped and intersects the wall of reactor 140 at a locus of points shown by broken line 148. The separate beds of solids communicate by means of orifice 146 which provides a passageway for the flow of particulate material from bed 142 to bed 144. Reactor 140 is provided with separate and parallel gas supply means for each compartment containing a separate fluidized bed of solids, which means are represented in the drawing by lines 161 and 171 for bed 142 and bed 144, respectively. Horizontally extending perforated grid 132 is provided for the purpose of distributing gaseous material uniformly in the respective fluidized beds. Internal cyclone 134 is positioned within an upper portion of reactor 140 and separates particulate material which is returned to the dense fluidized beds by means of diplegs 136. Separated gaseous material in line 135 is reheated by admixing such material with the hot gaseous combustion products from pretreatment zone 110, and the mixture is passed into cyclones 12 and 18 to preheat incoming ore feed.

Partial oxidation furnaces 160 and 170 provide means for supplying gaseous material containing oxidizing and reducing constituents over a wide range of reducing or oxidizing strengths as needed. The partial oxidation furnaces are fed with a fuel gas, e.g., natural gas, introduced in line 162 and air introduced in line 172. Valve 163 situated in line 166 controls the amount of natural gas introduced into furnace 170, while valve 165 situated in line 164 separately controls the quantity of gas introduced to furnace 160. Valve 173 in line 176, likewise, controls the quantity of air introduced to furnace 170, while valve 175 in line 174 controls the amount of air introduced to furnace 160. By manipulation of the natural gas and air control valves mentioned above, gaseous material of the desired oxidizing and reducing strength can be produced in partial oxidation furnaces 160 and 170. If it is desirable to do so, the gaseous material introduced by means of lines 161 and 171 may be of equal reducing strength. On the other hand, the composition of the gaseous material in line 161 can be made highly reducing with respect to particulate material entering bed 142 by closing down air valve 175, while simultaneously the gaseous material in line 171 can be made highly oxidizing with respect to the ore particles entering bed 144. Recycle gaseous material can be derived from line 66, as described with reference to FIGURE 1, and admixed with the gaseous products from the partial oxidation furnaces by means of lines 181 and 182 at a rate controlled by means of valves 180 and 183, respectively, to give further control of gaseous compositions in lines 171 and 161.

In the operation of reaction vessel 140, the particulate material introduced by means of line 130 into fluidized bed 142 is treated by means of gaseous material introduced in line 161. Particulate material from bed 142 flows through orifice 146 in baffle 138 into fluidized bed 144 for further treatment with gaseous material introduced in line 171. The height of bed 144 is controlled by throttling valve 153 in solids outlet conduit 152, while the height of bed 142 is determined by the relative densities of the dense beds of solids and the pressure drop through orifice 146. Particulate material is withdrawn from reactor 140 in line 152 for passage to cooling vessel 150. Quenching fluid, e.g., water, can be introduced into cooler 150 by means of line 154 to quench the product material and thereby reduce reoxidation of reduced material which is withdrawn to substantially atmospheric conditions in line 156. Alternately, the particulate material withdrawn from reactor 140 can be passed to a steam generation unit as described with reference to FIGURE 1, in order to extract heat values from the solids.

The following operation example is presented illustrating the system described with reference to FIGURE 2 of the drawings employed in the reduction of a low-grade hematite ore to obtain magnetic ore suitable for separation by magnetic separation methods and means.

*Example 1*

In this example, cold low-grade hematite ore having a particle size of about 20 mesh top size and containing 27.8 percent by weight Fe is introduced in line 10. The product in line 152 represents about 90 percent conversion to $Fe_3O_4$ in reactor 140. The raw composition of the ore employed in this example is given in Table 4, below.

TABLE 4

| Component: | Percent |
|---|---|
| $Fe_2O_3$ | 39.8 |
| $SiO_2$ (gangue) | 53.2 |
| Loss on ignition | 5 |
| Free $H_2O$ | 2 |
| | 100.0 |

TABLE 5

| Reference No. in Fig. 2 | Description | Flow Rate Long Tons/Hr. | Temp., °F. | Pressure p.s.i.a. | Average Solids Residence Time, mins. | Dense Bed Reaction Volume |
|---|---|---|---|---|---|---|
| 10 | Solids feed | 220 | Ambient | Atmos. | | |
| 100 | Solids | | 650 | | 33 | |
| 112 | Dense bed, 40 lbs./ft.³ density. | | 1,600 | | ² 36 | 41 | 1,540 ft.³ |
| 117 | Nat. gas fuel | ¹ 202 | 100 | | | |
| 118 | Air | ¹ 1,917 | 100 | | | |
| 126 | Solids | 212 | 825 | | | |
| 142 | Dense bed, 50 lbs./ft.³ density. | | 1,100 | | ² 40 | 49 | 7,350 ft.³ |
| 144 | Dense bed, 87 lbs./ft.³ density. | | 1,100 | | ² 40 | 18 | 1,550 ft.³ |
| 152 | Solids product | 201 | 1,100 | | | |

¹ Mol./hr.
² Grid.

Table 6, below, shows the gas composition required to obtain the above stated conversion in this example, employing feed composition of Table 4.

TABLE 6

| Reference no. in Fig. 2 | Mol percent $H_2+CO$ | $H_2/CO$ | $CO_2/CO$ | $H_2O/H_2$ | Mol/hr. $H_2+CO$ |
|---|---|---|---|---|---|
| 161 | 7.26 | 1.032 | 2.58 | 2.88 | 558 |
| 171 | 7.26 | 1.032 | 2.58 | 2.88 | 69.6 |
| 135 | 1.31 | 0.993 | 18.0 | 21.6 | 115.6 |
| 21 | 1.83 | 2.34 | 17.9 | 20.4 | 94.2 |

In Table 6, above, the remainder not specified comprises nitrogen gas.

Table 7, below, illustrates gas compositions required to obtain 90 percent conversion employing a low-grade hematite ore feed containing about 50 percent Fe, in the system of FIGURE 2.

TABLE 7

| Reference no. in Fig. 2 | Mol percent $H_2+CO$ | $H_2/CO$ | $CO_2/CO$ | $H_2O/H_2$ | Mol/hr. $H_2+CO$ |
|---|---|---|---|---|---|
| 161 | 10.7 | 1.212 | 1.87 | 1.8 | 867 |
| 171 | 10.7 | 1.212 | 1.87 | 1.8 | 108.6 |
| 135 | 2.42 | 2.85 | 20.2 | 9.91 | 229.6 |
| 21 | 1.84 | 2.47 | 19.8 | 22.1 | 106.5 |

The remainder of the gas not specified in Table 7 comprises nitrogen.

Example 2 is presented below to illustrate the treatment of a sideritic ore in the system described with reference to FIGURE 2 as compared with the treatment of such an ore in the system described with reference to FIGURE 1.

*Example 2*

Sideritic Greensand from Texas containing 38 percent Fe has the composition specified in Table 8 below.

TABLE 8

| Component: | Weight percent |
|---|---|
| $FeCO_3$ | 63 |
| $Fe_2O_3$ | 5 |
| Gangue | 31 |
| Free moisture | 1 |
| | 100 |

The ore specified in Table 8 is treated in the system described with reference to FIGURE 2 under the conditions set forth in Table 5, except that the particulate material is withdrawn at 1100° F. in line 126. The treating gases employed in reactor 40 have the composition set forth in Table 7. Essentially all of the siderite is converted to hematite under the weakly oxidizing conditions in pretreatment zone 110 in accordance with the following exothermic reaction:

The hematite is then converted to magnetite in reactor 140, as set forth in Example 1. The total heat input to the system is about 800,000 B.t.u./long ton of ore feed in this case.

By way of comparison, the ore specified in Table 8 is treated in the system described with reference to FIGURE 1, which does not contain pretreatment zone 110 containing dense bed 112. In such system, the ore is introduced to reactor 26 as siderite, and is converted to magnetite under the reducing conditions of the reactor in accordance with the following endothermic reaction:

The composition of the reducing gases entering reactor 26, operated at 1100° F., in line 50 are as specified in Table 9 below.

TABLE 9

| | |
|---|---|
| $H_2+CO$ mol percent | 6.0 |
| $H_2/CO$ | 0.0715 |
| $CO_2/CO$ | 2.73 |
| $H_2O/H_2$ | 28 |
| $N_2$ (remainder) mol percent | 67.5 |

In this case, the total heat input to the system is about 1,750,000 B.t.u./long ton of ore feed treated.

The positioning of baffle 138, and of any additional baffle which may be employed in reactor 140 so as to reduce the reaction volume required to an economically practicable volume is an important part of the present invention. In order to provide an understanding of the manner of positioning a baffle in the reaction zone, Example 3 is presented below describing the positioning of baffle 138 in reactor 140 for the conversion of hematite ore to magnetite employing a weak reducing gas containing $H_2$ and CO, e.g., as specified in Table 6.

Example 3 also illustrates the advantages of employing baffled reactor 140 of FIGURE 2 as compared with employing a reactor which does not contain a baffle, e.g., such as reactor 26 of FIGURE 1.

*Example 3*

In a continuous-flow fluidized solids reactor, particles which enter the bed are rapidly and intimately mixed together with those already in the bed. The outflowing stream of solids thus contains particles which have been undergoing reaction for varying lengths of time. In the reduction of iron ores the solid is the product desired, and the batch-reduction kinetics curve for an iron ore-reducing gas reaction can be determined (e.g., from bench scale laboratory tests). Taking into consideration the essentially instantaneous mixing of entering solids with the material already in the bed, the solids residence time which is required in a continuous-flow reactor to achieve any desired degree of conversion of the mixed outlet solids can be determined from the batch kinetics curve. The following batch kinetics curve for the conversion of hematite to magnetite in the presence of a weak reducing gas containing $H_2$ and $CO$ was experimentally determined.

TABLE 10

| Batch reduction time, minutes: | Conversion percent $Fe_3O_4$ |
|---|---|
| 0 | 0 |
| 10 | 60 |
| 22 | 80 |
| 27 | 85 |
| 35 | 90 |

It will be noted that the first portion of this reaction proceeds quite rapidly, while at higher conversions the reaction rate drops off drastically and becomes exponential with time.

In the reduction of a hematite ore having the batch reduction curve set forth above, it is seen that in order to achieve 90 percent conversion in a continuous-flow reactor having a single reaction bed, e.g., such as in reactor 26 in FIGURE 1, a solids residence time of 143 minutes is required (versus the 35 minutes batch residence time) and to obtain 7500 pounds per minute of outlet solids the required dense bed reaction volume is about 16,000 cubic feet. However, by installing one or more baffles in the dense bed positioned to carry out separate portions of the overall reaction in a series of separated beds, the required solids residence time in the continuous-flow reactor is markedly decreased with consequent savings in the cost of equipment. For example, with the addition of a single baffle in the bed which has been positioned to achieve 80 percent average conversion in the first section and the remaining 10 percent in the second section, the total required solids residence time is decreased to 67 minutes and the dense bed reaction volume is decreased to 8,900 cubic feet. Addition of more baffles progressively reduces the required solids residence time and as the number of baffles approaches infinity, the residence time in the continuous-flow reactor approaches the batch residence time, namely, 35 minutes.

The positioning of a baffle in a continuous-flow reactor must satisfy all of the following requirements:

(1) The total solids residence time for the number of baffles selected, as determined by the batch kinetics curve of the reaction and the ultimate conversion desired, assuming instantaneous mixing.

(2) Desired limitations on the dense bed height/diameter ratio to insure good operability ($H/D=0.7$ maximum for iron ores).

(3) The gas velocity-bed density relationship for the particular material in the dense beds.

(4) The pressure balance at the grid—i.e., pressures at the grid must be identical in the various sections of the reactor. This is essential in order to achieve a practical mechanical design of the grid and the vapor baffle below the grid.

It should be noted that for the example of reduction to magnetite previously given, it is possible to determine several alternate positions for a single baffle each of which satisfy all the above requirements while still achieving 90 percent overall conversion with maximum bed $H/D=0.7$, as set forth in Table 11, below.

TABLE 11

| Percent as $Fe_3O_4$ in first section | $(H/D)_1$ | $(H/D)_2$ | Area 1, sq. ft. | Area 2, sq. ft. | Total Area, sq. ft. | Total Solids Residence Time, minutes |
|---|---|---|---|---|---|---|
| 65 | 0.7 | 0.19 | 313 | 618 | 931 | 61 |
| 77 | 0.7 | 0.52 | 413 | 240 | 653 | 65 |
| 80 | 0.7 | 0.67 | 444 | 164 | 608 | 67 |
| 90 | 0.7 | | 725 | | 725 | 143 |

Subscript 1 refers to the first section of the bed, e.g., bed 142 of reactor 140.
Subscript 2 refers to second section of bed, e.g., bed 144 of reactor 140.

In the above case, it was found most economic to select the baffle position which gave the minium total reactor cross-sectional area, which corresponds to achieving 80 percent conversion in the first section of the reactor as previously described.

Example 4, presented below, illustrates and compares the method of the present invention for the reduction of difficultly reducible ores in a baffled reactor with a known reduction method. The Rusk ore of Texas which contains about 41 percent Fe is a hard-to-reduce ore, and its composition is set out in Table 12.

*Example 4*

TABLE 12

| Component: | Weight percent |
|---|---|
| $Fe_2O_3$ | 56.3 |
| $Fe_3O_4$ | 2.4 |
| Gangue | 28.2 |
| Loss on ignition | 11.7 |
| Free moisture | 1.4 |
| | 100.0 |

The ore of Table 12 is treated at 1100° F. with the standard reducing gases specified in Table 13 which gases have compositions favoring magnetite formation at the reduction temperature employed. The reduction characteristics of the ore under such conditions are specified by means of the batch reduction curve set forth in Table 14.

TABLE 13

| Mol percent $H_2+CO$ | $H_2/CO$ | $CO_2/CO$ | $H_2O/H_2$ | $N_2$ is |
|---|---|---|---|---|
| 9.7 | 0.59 | 2.1 | 2.0 | remainder |

TABLE 14

| Time, minutes: | Percent Fe as $Fe_3O_4$ |
|---|---|
| 0 | 4.1 |
| 15 | 37 |
| 60 | 47 |
| 240 | 52 |

It is seen that after treatment with the reducing gas of Table 13 for 240 minutes the percent Fe in the form of magnetite is only 52 weight percent.

Ore having the composition specified in Table 12 is treated in baffled reactor 240 described with reference to FIGURE 2 with the gaseous material and under the conditions specified in Table 15 as follows.

TABLE 15

| Reference No. in Fig. 2 | Mol percent H₂+CO | H₂/CO | CO₂/CO | H₂O/H₂ | Temp. °F. | Residence Time, mins. |
| --- | --- | --- | --- | --- | --- | --- |
| 161 [1] | 46 | 1.88 | 0.106 | 0.147 | | |
| 171 [2] | | 1.77 | 1.75 | 17.6 | 7.3 | |
| 142 | | | | | 1100 | 25 |
| 144 | | | | | 1200 | 15 |
| 161 [3] | 31 | 1.68 | 0.48 | 0.57 | ([4]) | |

[1] This composition specified favors elemental iron (Fe) formation at equilibrium.
[2] This composition favors magnetite formation at equilibrium.
[3] This composition specified favors wustite (FeO) formation at equilibrium.
[4] In bed 142.

Figures 3, 4:
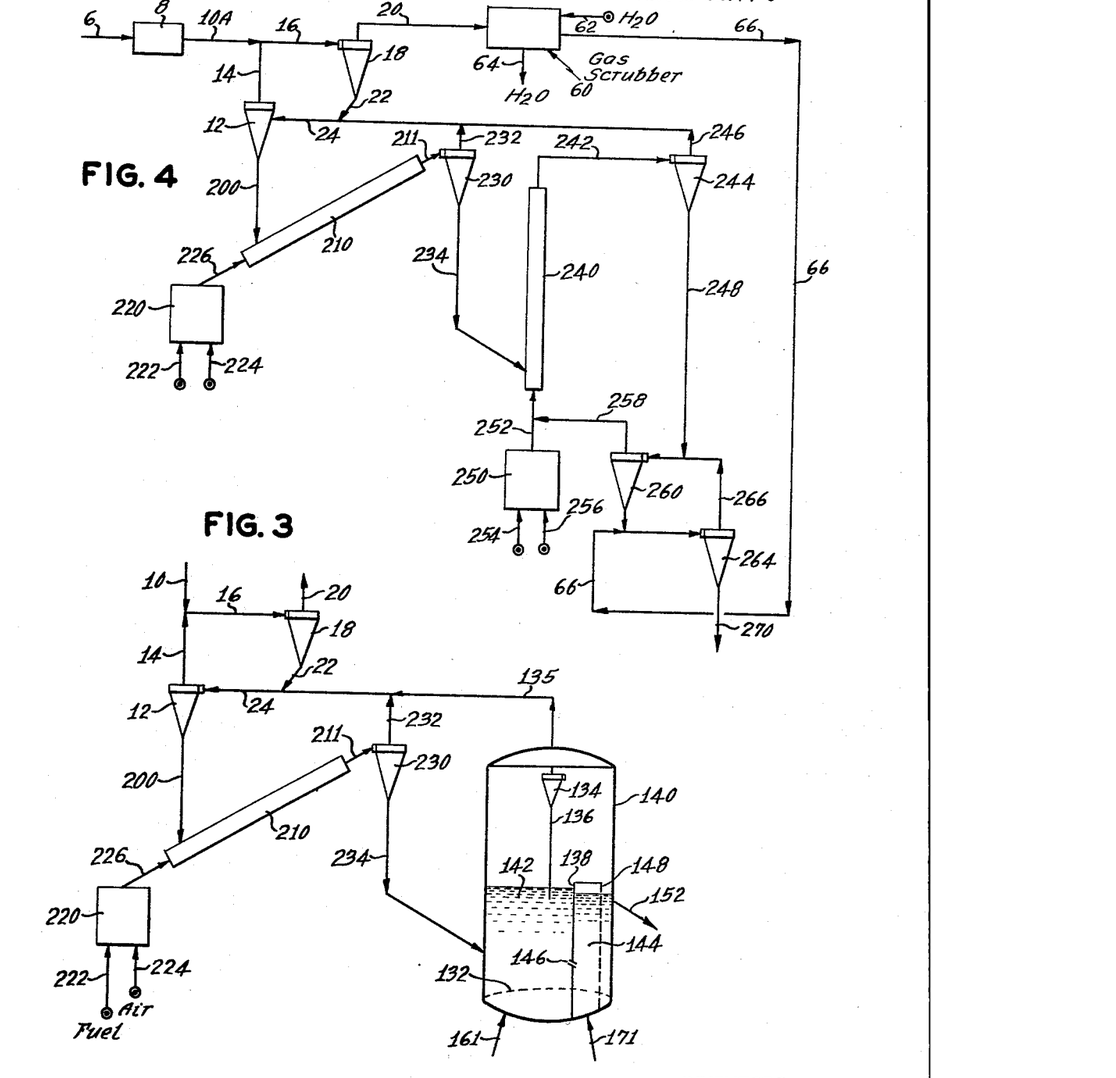
FIGURE 3 illustrates a modification of the embodiment shown in FIGURE 2.
FIGURE 4 illustrates one embodiment of a process employing transfer line pretreatment and reaction zones in the reduction of comminuted ores of metal oxide in accordance with the present invention.

FIGURE 3 illustrates a modification of the embodiment of the process described with reference to FIGURE 2, in which the fluidized bed pretreatment zone 110 in FIGURE 2 is replaced by the preheat burner 220, transfer line heat exchanger conduit 210 and cyclone 230. In this embodiment, fuel and air are introduced to heater 220 by means of lines 222 and 224, respectively. The combustion products at an elevated temperature and preheated ore particles withdrawn from cyclone 12 are introduced to a lower portion of transfer line heat exchanger conduit 210 thereby forming an upwardly moving gas solid suspension. The velocity of the suspension is generally maintained between about 10 and about 90 feet per second. The ore particles are heated by contact with the gaseous material in conduit 210. The gaseous material and ore particles are passed into cyclone 230 for separation. Particles are withdrawn downwardly from cyclone 230 in line 234 and passed therefrom into dense bed 142 of reactor 140. Gaseous material at an elevated temperature is withdrawn from cyclone 230 and mixed with the hot gaseous reactor effluent in line 135 for passage in contact with relatively cool particulate material in cyclones 12 and 18.

FIGURE 4 illustrates another embodiment of the process of the present invention. In this embodiment, a low-grade hematite ore is introduced to the process in line 6. The ore is subjected to a grinding operation in grinding zone 8 for the purpose of comminuting the ore to such an extent that the hematite is substantially liberated from the gangue and siliceous material. This occurs when the ore is ground to a size range between about 12 mesh top-size and about 500 mesh top-size, depending upon the liberation characteristics of the specific ore being comminuted. It is to be understood that certain ore reserves are available wherein the hematite is already liberted from the gangue making the aforementioned step unnecessary such as, e.g., the 14 mesh top-size wash plant tailings from the Prindle mine in Minnesota. Finely ground material is introduced to cyclones 18 and 12 to be preheated, as previously described with reference to FIGURE 1. Preheated particulate material is withdrawn from cyclone 12 to be further heated in transfer line heat exchanger 210, as was described with reference to FIGURE 3. The particulate feed, heated to within about the range of reaction temperatures hereinafter set forth, is separated from gaseous material in cyclone 230 and introduced by means of line 234 to transfer line reactor 240. In order to provide reducing gase of suitable strength, natural gas in line 254 and air in line 256 are fed into partial oxidation furnace 250. Reducing gas of suitable strength is introduced from furnace 250 into reactor 240 by means of conduit 252. In this embodiment, the conditions in transfer line reactor 240 are maintained such that only a superficial portion of the hematite containing particulate material in the reaction zone is reduced to magnetite. Thus-magnetized surfaces are readily separated from gangue and siliceous material by conventional magnetic separation methods and means. The conditions in reactor 240 including contact time and temperature and gas composition are generally maintained such that a minor portion of the hematite particles are converted to magnetite. The conditions preferably maintained are a temperature between about 1100 and about 1800° F., and a reaction time between about 0.5 and about 12 seconds. Solid and gaseous material are withdrawn from reactor 240 in line 242 and separated by means of cyclone 244. The gaseous material is passed together with the gaseous combustion products from line 232 to cyclone 12. Product material is passed in line 248 from cyclone 244 into a system of gas solid contact means, including cyclones 260 and 264 for cooling solid material against recycle gas. In the cyclones, the relatively hot product material is contacted with relatively cool recycle gases introduced from line 66, first in cyclone 260 and then in cyclone 264. Gaseous material is passed from cyclone 264 to cyclone 260 by means of line 266, and from cyclone 260 into reactor 240 by means of line 258. Cooled product material is withdrawn to atmospheric conditions by means of conduit 270.

In order to illustrate the process described with reference to FIGURE 4, Example 5 is presented below.

*Example 5*

The low-grade hematite ore specified in Table 16, below, is ground to 200 mesh top-size for substantially complete liberation of hematite from gangue. The ore contains about 45 percent Fe and is employed as feed, after suitable preheating, into reactor 240 of FIGURE 4.

TABLE 16

| Component: | Composition (wt. percent) |
| --- | --- |
| Fe₂O₃ | 54 |
| Fe₃O₄ | 10 |
| Gangue | 33 |
| Loss on ignition | 3 |
| Free H₂O | -- |
| | 100 |

Operating conditions which are employed to treat the ore of Table 16 with reference to FIGURE 4 are specified in Table 17, below. The ore is contacted for an average particle residence time of about 12 seconds in transfer line reactor 240 and the product obtained is converted to about 25 percent magnetite.

TABLE 17

| Reference No. in Fig. 4 | Temperature, °F. | Percent H₂+CO |
| --- | --- | --- |
| 252 | 1,700 | 46 |
| 258 | 1,200 | 15 |
| 240 | 1,500 | |
| 242 | 1,500 | 16 |
| 234 | 1,450 | |

In the processes as hereinbefore described, the reactor effluent gases are admixed with combustion gases from the pretreatment zone and the combined gaseous stream is used to preheat the cold entering solids, after which a portion of the thus-cooled combined gas is vented from the system, while another portion is quenched, scrubbed and recycled to the reactor. This recycle serves to control reactor inlet gas composition and also to conserve H₂ and CO which are present in the reactor effluent.

Alternatively, it is desirable that the recycle stream be composed only of reactor effluent gases instead of the mixture of such gases with the effluent of the pretreatment zone, since the reactor gases normally contain a higher percentage of $H_2$ and CO than the aforementioned admixed gases. In this case, the effluent of the pretreatment zone is heat exchanged against incoming solid material and then vented to the atmosphere. This selective recycle serves to further reduce the amount of unreacted $H_2$ and CO which is vented to the atmosphere. It will be apparent that in order to segregate this selective recycle, it is necessary to provide a separate train of solids-gas heat exchange cyclones, such as cyclones 12 and 18 (or other contacting devices) and a separate gas scrubber and recycle line such as scrubber 60 and line 66. Likewise, it is contemplated that the effluent gases from one or more sections of the baffled reactor which contain a higher $H_2$ and CO content than the average reactor effluent can be advantageously selectively recycled. For example, in Example 4, referring to FIGURE 2, wherein the gas entering bed 142 has a composition favorable to wustite or elemental iron formation, the effluent gases therefrom are higher in $H_2$ and CO than the effluent from bed 144, since the gaseous feed to bed 144 is in equilibrium with magnetite. In such case, it is advantageous to recycle the gas relatively higher in reducing components separately from the lean gas. In Example 5, referring to FIGURE 4, it is also advantageous to practice selective recycle of the effluent 242 of reactor 240 which is relatively higher in $H_2$ and CO separate from effluent 211 of transfer line heat exchange conduit 210 which is of relatively low calorific value.

Many modifications and alterations of this invention will be apparent to those skilled in the art without departing from the spirit and scope of the present invention which is limited only by the claims.

What is claimed is:

1. A method for reducing low-grade iron-containing ores which contain material decomposable and/or volatile at the reduction temperature employed to reduce the ore which comprises: contacting feed material comprising such ore in particulate form with a reheated gaseous effluent of the reduction zone obtained as hereinafter defined to heat such particulate material, passing a first portion of such heated particulate material to a dense phase bed of fluidized particulate material maintained in a pretreatment zone, combusting a suitable fuel in said pretreatment zone maintained at a temperature between about 1400 and about 1800° F., maintaining said first portion of particulate feed material in a pretreatment zone for a time sufficient to heat the particulate material to a temperature within the range of temperatures set out above, admixing said first portion withdrawn from the pretreatment zone with a second portion of said heated particulate material to obtain a mixture of particles at a temperature within the range set out below, passing said mixture of material to the reduction zone maintained at a temperature between about 800 and about 1400° F. to reduce such material, and admixing gaseous combustion products separated from the fluidized bed pretreatment zone with the gaseous effluent of the reduction zone to reheat said effluent to an elevated temperature.

2. In a method for the reduction of non-magnetic iron-containing material to obtain $Fe_3O_4$ in which the reduction is carried out in a fluidized bed reduction zone, the improvement which comprises: maintaining a fluidized bed of said material in particulate form in said reduction zone at a temperature between about 800 and about 1400° F.; introducing into said reduction zone a reducing gas stream having reducing and oxidizing components of composition fixed within equilibrium values at the reduction temperature within the aforementioned range so that overreduction beyond the $Fe_3O_4$ point cannot occur; withdrawing a gaseous effluent of low calorific value from said reduction zone at a temperature within the aforementioned range; combusting a suitable fuel and contacting the products of combustion with heated particles obtained as hereinafter described in a fluidized particle heat transfer zone to further heat such particles, separating gaseous combustion products from said particles and admixing such products with the gaseous effluent of low calorific value to heat said effluent to between about 1000 and about 2000° F., and passing such particles to said reduction zone; contacting relatively cool iron-containing particles and the thus-heated gaseous effluent to cause said particles to be heated to an elevated temperature, separating said heated particles from said gaseous effluent, and passing said particles to said fluidized heat transfer zone.

3. The method of claim 1 in which said reduction zone is maintained at a temperature between about 1000° and about 1200° F.

4. The method of claim 1 in which said pretreatment zone is maintained at a temperature between about 1500° and about 1700° F.

5. The method of claim 2 in which said non-magnetic iron-containing material comprises a low grade hematite ore.

References Cited by the Examiner

UNITED STATES PATENTS

| | | | |
|---|---|---|---|
| 2,477,454 | 7/1949 | Heath | 75—1 |
| 2,528,552 | 11/1950 | Royster | 75—1 |
| 3,020,149 | 6/1962 | Old et al. | 75—26 |

FOREIGN PATENTS

| | | |
|---|---|---|
| 674,804 | 11/1926 | Canada. |
| 1,143,415 | 4/1957 | France. |
| 873,770 | 7/1961 | Great Britain. |

BENJAMIN HENKIN, *Primary Examiner.*

DAVID L. RECK, *Examiner.*